US012138635B2

(12) United States Patent
Specht et al.

(10) Patent No.: US 12,138,635 B2
(45) Date of Patent: Nov. 12, 2024

(54) HYDRAULIC DENSITY SEPARATION DEVICE

(71) Applicant: LIG GmbH, Velbert (DE)

(72) Inventors: Günter Specht, Freital (DE); Sebastian Scheller, Rabenau (DE); Jörg Thomas, Dresden (DE); Sebastian Kemper, Witten (DE)

(73) Assignee: LIG GmbH, Velbert (DE)

( * ) Notice: Subject to any disclaimer, the term of this patent is extended or adjusted under 35 U.S.C. 154(b) by 0 days.

(21) Appl. No.: 18/504,756

(22) Filed: Nov. 8, 2023

(65) Prior Publication Data

US 2024/0198355 A1 Jun. 20, 2024

(30) Foreign Application Priority Data

Dec. 15, 2022 (DE) ..................... 10 2022 004 719.5

(51) Int. Cl.
*B03B 5/52* (2006.01)

(52) U.S. Cl.
CPC ..................................... *B03B 5/52* (2013.01)

(58) Field of Classification Search
CPC ........................................................ B03B 5/52
USPC .......................................................... 209/156
See application file for complete search history.

(56) References Cited

U.S. PATENT DOCUMENTS 2,189,419 A * 2/1940 Finney ...................... B03B 5/52 209/464
2,283,992 A * 5/1942 Hirsch ...................... B03B 5/52 209/464
5,570,790 A * 11/1996 Rumpf ...................... B07B 1/20 209/291

FOREIGN PATENT DOCUMENTS

DE 3717847 A1 * 12/1987
DE 202012009648 U1 * 6/2013 .......... B01F 15/0251
EP 3581276 A1 * 12/2019 ............ B03B 11/00
EP 3581276 B1 5/2021
KR 101279795 B1 * 6/2013

OTHER PUBLICATIONS

Office Action in Corresponding German Application No. 10 2022 004 719.5, dated Aug. 3, 2023, 6 pages.

* cited by examiner

*Primary Examiner* — Terrell H Matthews
(74) *Attorney, Agent, or Firm* — Andrus Intellectual Property Law, LLP

(57) ABSTRACT

A hydraulic density separation device for separating a heavy material fraction with components of higher density from a light material fraction with components of lower density from a feed material includes a conveying device for conveying away the heavy material fraction, receiving chamber which can be filled with water for receiving the feed, a flow generator for generating a water flow in the receiving chamber and a water-fillable separation chamber for receiving the light material fraction. The conveying device has a shaft with a screw conveyor section for conveying the heavy material fraction out of the receiving chamber. The flow generator is designed and arranged such that a flow path of the water flow leads from the receiving chamber into the separation chamber. The conveying device has, in addition to the screw conveyor section, at least one washing section having a plurality of separate paddles arranged on the shaft.

20 Claims, 11 Drawing Sheets

HYDRAULIC DENSITY SEPARATION DEVICE

CROSS-REFERENCE TO RELATED APPLICATION

The present application claims priority to German Patent Application No. 10 2022 004 719.5, filed Dec. 15, 2022, which is hereby incorporated herein by reference.

FIELD

The present invention relates to a hydraulic density separation device for separating a heavy material fraction with components of higher density from a light material fraction with components of lower density from a feed material. The density separation device has a conveying device for conveying away the heavy material fraction and a receiving chamber which can be filled with water for receiving the feed material. Furthermore, the density separation device comprises a flow generator for generating a water flow in the receiving chamber and a separation chamber which can be filled with water for receiving the light material fraction.

BACKGROUND

In the context of the present invention, it will be understood that during operation of the density separation device, the receiving chamber and the separation chamber are at least partially filled with water so that a hydraulic density separation process can take place for separating the heavy material fraction from the feed material. This separation process can primarily take place in the receiving chamber, which can consequently also be referred to as a separation chamber.

Density separation devices of the aforementioned type are known in the state of the art. In this context, different devices are known, which are designed in particular for separating different feed materials. A particularly advantageous hydraulic density separation device is known from EP 3 581 276 B1. Here, a conveying device is provided for conveying away the heavy material fraction, which can be designed as a screw conveyor. Furthermore, in the embodiment of the density separation device known from EP 3 581 276 B1, it is provided that a flow generator is provided which is constructed and arranged in such a way that a flow path of the water flow leads from the receiving chamber into the separation chamber. This water flow can then be used to separate the light material fraction and ultimately transfer it to the separation chamber. Thus, in contrast to other prior art, the known density separation device provides two different chambers for separating the fractions, wherein a water flow ensures that the light material fraction is transferred from the receiving chamber into the separation chamber. The screw conveyor can then be used to convey away the heavy material fractions. Thus, a high separation efficiency can be achieved and the light material or the light material fraction can be separated from the heavy material fraction with a high separation efficiency.

However, the disadvantage of the embodiment according to EP 3 581 276 B1 is that due to the arrangement of the individual components of the density separation device predetermined by the process sequence, the size of the density separation device is too small in most applications or the achievable throughput is too low. In addition, it has been found in practice that the heavy material fraction that can be conveyed away via the conveying device contains impurities and/or adhering dirt and usually requires costly reprocessing. In particular, it is necessary to clean the heavy material fraction again.

SUMMARY

It is now the task of the present invention, starting from the density separation device known from EP 3 581 276 B1, to avoid the aforementioned disadvantages or at least to substantially reduce them.

The aforementioned task is solved by a hydraulic density separation device according to the claims.

The density separation device according to the invention is ultimately based on the principle that the heavy material fraction sinks in the receiving chamber and the light material fraction rises depending on the respective density of the individual components. The transport of the light material fraction from the receiving chamber into the separation chamber is also supported or guided by the water flow provided.

According to the invention, the density separation device has a conveying device for conveying away the heavy material fraction, a receiving chamber which can be filled with water for receiving the feed material, a flow generator for generating a water flow in the receiving chamber and a separation chamber which can be filled with water for receiving the light material fraction.

The conveying device has a shaft with at least one screw conveyor section for conveying the heavy material fraction on the receiving chamber. Furthermore, the flow generator is designed and arranged in such a way that a flow path of the water flow leads from the receiving chamber into the separation chamber.

According to the invention, it is further provided that the conveying device has, in addition to the screw conveyor section, at least one washing section having a plurality of separate paddles arranged on the shaft.

The paddles are in particular spaced apart from one another. Very preferably, the paddles in the washing section are arranged in such a way that the individual paddles at least substantially follow the helix and/or spiral line of the adjacent conveying screw of the screw conveyor section. For this purpose, the paddles can in particular also be arranged at an angle on the shaft, so that the paddles are preferably aligned and arranged at least substantially along the helix of the winding of the adjacent screw conveyor section.

The washing section enables the significant advantage that washing and cleaning of the heavy material fraction can take place during the removal of the heavy material fraction from the receiving chamber. In particular, mineral and/or other residues adhering to the heavy material fraction can be dissolved in this way. It may also be provided that the washing section serves to separate a residual fraction adhering to the heavy material fraction. Accordingly, the provision of the washing section in the conveying device according to the invention can enable a heavy material fraction to be separated from the feed material with a high degree of purity and a high degree of selectivity.

Particularly preferably, a complex post-treatment of the heavy material fraction can be avoided, which would otherwise have to be carried out in the state of the art. This reduces the overall effort for the separation of the heavy material fraction and thus leads to a reduction in the costs for carrying out a density separation process for separating the heavy material fraction from the feed material. In addition to the function of conveying the heavy material fraction, the conveyor also has the function of cleaning and washing the heavy material fraction transported in the conveyor and thus provides a multitude of advantages according to the invention due to the "double function", which in particular are not reflected in a simplified process sequence.

The receiving chamber can also be called a separation chamber, since the separation process takes place in the receiving chamber, namely the separation of the heavy material fraction and the light material fraction.

In particular, the screw conveyor section may have a helix and/or a screw vane extending at least 360° around the circumference of the shaft.

During the separation process, the heavy material fraction can settle on the bottom and/or in the lower area of the receiving chamber, which can also be referred to as the trough bottom and/or trough bottom area, and can ultimately be conveyed away from the bottom area via the conveyor. In particular, the light material fraction does not sink to the trough bottom and is transferred to the separation chamber via the water flow. The density of the components of the light material fraction is in particular at least substantially equal to or lower than the density of the water used in the density separation device. Other components of the light material fraction can also have a density that is slightly greater than the density of the water used. These components can then be fed to the separation chamber by assisting the water flow.

In addition, a closed water circuit can also be provided. Thus, the water provided in the separation chamber can also be supplied to the receiving chamber again via the flow generator and transferred to the separation chamber again via the generated water flow in the receiving chamber. If necessary, water can also be removed or fresh water can be added, as will be explained in detail below.

The feed material contains in particular solid material and/or is composed of individual solid materials. Preferably, the heavy material fraction can contain stones. The light material fraction can be composed of twigs, plastic and/or synthetic material, foam material, wood, aerated concrete, woven material and/or smaller stones, etc. Preferably, the density separation device can be used in a quarry and/or in a brick quarry. However, other locations are also possible where hydraulic density separation of the feed material is required.

In a particularly preferred embodiment of the present invention, a plurality of conveyor sections is provided, with a washing section being arranged between two adjacent screw conveyor sections. Alternatively or additionally, a plurality of washing sections may be provided, in particular wherein the washing sections and the screw conveyor sections are arranged alternately.

In particular, the screw conveyor sections serve to convey the heavy material fraction in the conveying direction of the conveying device and the washing sections serve to wash and clean the material transported in the conveying device, namely the heavy material fraction. The washing sections thus preferably only extend over part of the length of the shaft in order to be able to provide further sections of the shaft of the conveyor device for the screw conveyor sections and thus for conveying away the heavy material fraction. A plurality of screw conveyor sections and washing sections has the advantage that the heavy material fraction can be washed in several sections, whereby an increased degree of separation can be achieved for separating the residual fraction adhering to the heavy material fraction, which is in particular of mineral origin. In this context, it may be provided that the washing sections are completely or at least partially arranged in the water during the operation of the density separation device. The screw conveyor sections may, but need not, be arranged in the water.

For the rear area of the shaft of the conveyor facing the discharge end, it is advisable to insert a screw conveyor section, as this does not have to be arranged in the water, but can continue to fulfil the function of conveying away the heavy material fraction.

Washing the heavy material fraction at the washing sections makes sense if the washing can take place in the water. Accordingly, the conveyor can preferably be arranged at least partially in the water during operation. The conveyor does not have to be completely arranged in the receiving chamber, but one section of the conveyor can be arranged in the receiving chamber and another section outside the receiving chamber.

Preferably the washing section has between 2 to 52, preferably between 4 to 36 and in particular between 12 to 24 paddles. In connection with the present invention, it has been found that the aforementioned number of paddles is particularly advantageous for efficient cleaning of the heavy material fraction in the washing section. Also, the number of paddles results in particular in dependence on the individual design of the paddles, the desired cleaning performance as well as the helical pitch of the adjacent screw conveyor section. Particularly preferably, the paddles are arranged in the washing section in such a way that they follow the helix (with at least essentially the same helical pitch) of at least one adjacent screw conveyor section. In this context, it has been found during the development of the invention that preferably four paddles are used for each 360° winding of a screw conveyor and/or can bridge a 360° winding of the helical line (which is ultimately intended).

The shaft is in particular rotatably mounted and arranged at least in part in the receiving chamber. The paddles can extend in particular over an angular range of less than 90° over the circumference of the shaft. Other angular ranges are also possible in principle in further embodiments.

Preferably, the winding of the screw conveyor section extends over a range between 360° and 1440°, preferably between 360° and 720°. In this context, the word "winding" refers to the interconnected helical section of the screw conveyor. A 360° winding thus surrounds the shaft once circumferentially. In particular, the pitch of the helix can be at least substantially constant over the helix of the screw conveyor section. In particular, the helical pitch is at least substantially the same and constant for all screw conveyor sections. Thus, an efficient discharge of the heavy material fraction can take place.

In a further preferred embodiment, it is provided that adjacent washing sections have a different number of paddles and/or differently designed and/or arranged paddles. The number or orientation of the paddles can be selected depending on the cleaning result to be achieved in the washing section. In a further preferred embodiment, it is provided that adjacent screw conveyor sections have differently formed windings. The windings may differ in terms of their helical pitch and/or their extension around the circumference of the shaft. For example, one winding may extend over a range between 360° to 500° and another winding of an adjacent screw conveyor section may extend over 500° to 720°. As previously explained, it is particularly preferable in this context if the helical line running over the shaft, which is formed by the helixes of the screw conveyor sections, also continues in the washing sections, so that the paddles are arranged and aligned in such a way that the helical line of the adjacent screw conveyor section continues in the area of the paddles. Accordingly, material can also be transported in the area of the washing sections. However, the paddles do not necessarily have to continue the helix line of the adjacent screw conveyor section. Ultimately, the material stream to be conveyed is moved by the screw conveyor and pushed through the water section, even if this only has a washing function.

Preferably, however, the paddles can be arranged at an angle on the shaft in such a way that the material transport of the heavy material fraction in the conveying direction of the shaft and/or in the conveying direction of the conveying device also takes place in the area of the respective washing section. Accordingly, the heavy material fraction can also be transported further through the washing sections in the area of the washing sections in the direction of conveyance and simultaneously cleaned and washed.

In particular, the residual fraction separated in the washing sections can remain in the water and, if necessary, be removed from the density separation device after the entire density separation device has been switched off and then reprocessed as required. A separate removal of the residual fraction, which is separated in the washing sections, during the ongoing operation of the density separation device can be provided by suitable means, but does not have to be. In particular, the residual fraction settles on the water surface or dissolves in the water. Preferably, however, the residual fraction that is separated in the washing sections is not transported back into the receiving chamber.

Furthermore, in another preferred embodiment of the invention, it is provided that a plurality of paddles is arranged one behind the other with respect to the longitudinal direction of the shaft and/or one behind the other in the circumferential direction of the shaft. Such an arrangement of the paddles makes it possible that a material transport can also take place in the washing sections, since an efficient cleaning of the heavy material fraction in the area of the washing sections can take place with a corresponding rotation and/or turning of the shaft. Ultimately, the individual paddles constantly swirl and/or throw up the heavy material fraction in the area of the washing sections and comb through the heavy material fraction in the area of the washing sections, which leads to efficient loosening of the heavy material fraction and detachment of adhesions.

Preferably, the radial paddle length is at least substantially equal to the web height of the winding of at least one adjacent screw conveyor section. In particular, the web height of the winding is at least substantially the same in one and especially in all screw conveyor sections and preferably at least substantially the same. The radial paddle length refers to the radial distance to the shaft. Thus, the radial paddle length protrudes from the outside of the shaft. The same length of paddle and screw section can ensure that the top edge of both the winding and the paddle to the housing wall of an adjacent conveyor housing in which the shaft is arranged can be at least substantially constant. This distance between the outermost upper edge of the winding and/or the paddle to the housing wall of the conveyor housing can be selected depending on the desired separation grain size and is particularly preferably at least two times the separation grain size. In particular, the distance of the outermost upper edge of the winding and/or the paddle to the housing wall of the conveyor housing can be at least 30 mm, preferably between 40 mm to 900 mm, more preferably between 100 mm to 200 mm. This distance ensures a safe separation of the heavy material fraction and a discharge of the heavy material fraction.

In particular, the conveyor housing is designed to be watertight. The conveyor housing can be circumferentially closed or open at the top. In the case of an opening at the top, a further cover, such as a grille, can be provided so that manual intervention from the outside in the operation of the conveying device can be prevented. In particular, the conveyor housing may adjoin the receiving chamber and/or the wall of the receiving chamber. The conveying housing can also be fillable and/or filled with water, at least in certain areas, during operation of the density separation device.

In a further preferred embodiment, it is provided that the shaft is arranged and/or mounted at an angle of between 8° to 85°, preferably between 10° to 70°, in particular between 12° to 20°, relative to the ground. The inclined arrangement of the shaft in relation to the ground can ensure that washing of the heavy material fraction can take place in the water-filled area of the conveyor housing and that a further section of the conveyor housing is arranged outside and above the water line, so that no unnecessary loss of water occurs when the heavy material fraction is discharged.

In particular, the shaft is rotatably mounted with one shaft end in the area of the receiving chamber and with its other shaft end in the area of the discharge opening of the heavy material fraction. In this context, the conveyor housing can in particular be supported at least indirectly, preferably directly, on the ground.

Furthermore, an outflow opening of the flow generator can open into the receiving chamber. Alternatively or additionally, it can be provided that the separation chamber is designed as a suction chamber for the flow generator, in particular wherein a suction pipe is associated with the flow generator, which suction pipe is arranged at least in regions in the separation chamber for sucking in the water located in the separation chamber. Thus, the separation chamber can in particular also serve as a water reservoir for the flow generator. Accordingly, a water circuit can be ensured in which the water can be conveyed from the flow generator into the receiving chamber. The water (together with the light material fraction) is then transported into the separation chamber, in particular via a weir, by the flow present in the receiving chamber, which is ultimately generated by the flow generator. The water present in the separation chamber can then be fed to the receiving chamber again via the flow generator. If necessary, water can also be supplied or discharged in this closed water circuit. If necessary, the density of the water can be adjusted or changed in such a way that the light material fraction with the desired density range can be separated.

The flow generator can be arranged in a flow tube. This flow tube can be arranged outside the receiving chamber and its outflow opening can open into the receiving chamber. The arrangement in the flow tube can then ensure that the flow generator can be protected from mechanical damage, in particular by the feed material. The flow tube can also be associated with the separation chamber and/or the intake tube, namely in particular in such a way that an opening in the flow tube can be coupled to the intake tube for sucking in water. In this context, the intake pipe and the flow tube may be directly connected, but do not have to be. The flow generator can be operated with a motor which is arranged protected from water outside the flow tube and preferably also outside the separation chamber.

Preferably, at least one curved deflection area for the water flow is provided, which is arranged in the receiving chamber and, at least in the west, opposite and/or below the shaft. The deflection area can in particular have a curved wall. The curved wall may in particular be such that it is at least substantially arcuate in cross-section and more elongate. Preferably, the curved deflection area is formed as a section of a cylinder jacket surface.

Further preferably, it may be provided that the central axis of the outflow opening extends below the central longitudinal axis of the shaft. Accordingly, the outflow opening and in particular also the flow generator can preferably be arranged below the conveyor device and/or below the shaft. In this way, a safe discharge of the heavy material fraction via the conveying device can be ensured, wherein at the same time the heavy material fraction can also be exposed to the water flow generated by the flow generator, which can increase the degree of separation.

In another preferred embodiment, it is provided that a weir is arranged between the receiving chamber and the separation chamber. The weir can, for example, be formed as an opening in a wall of the receiving chamber, which can preferably also serve as a wall of the separation chamber. Preferably, the flow path for the light material fraction leads from the upper area of the receiving chamber via the weir into the separation chamber. Along with the light material fraction, water can also pass from the receiving chamber via the weir into the separation chamber. Preferably, the weir is arranged and designed in such a way that the heavy material fraction is not guided into the separation chamber via the weir. Thus, the weir is arranged in the upper area of the receiving chamber, whereas the mounted shaft end of the conveying device is arranged in the lower area of the receiving chamber, preferably in the bottom area.

In a further preferred embodiment, it is provided that a further conveying device is associated with the separation chamber for discharging the light material fraction. In particular, the further conveying device is designed as a vibrating screen. Particularly preferably, the conveying plane of the further conveying device runs at least in some areas below the upper edge of the weir. Particularly preferably, the further conveying device is arranged in such a way that, during operation of the density separation device, it is arranged only partially within the water and/or only partially below the water level. The light material fraction, which is guided onto the further conveying device, can be guided to the discharge side by shaking or vibrating movements, in particular wherein the discharge side and/or to the discharge end of the further conveying device is no longer arranged in the water. In this context, it may be envisaged that the further conveyor device is arranged sloping down to the discharge end or at least essentially parallel to the ground.

In a further particularly preferred embodiment, it is provided that the conveying direction of the further conveying device runs at least essentially opposite to the conveying direction of the conveying device. The conveying device and the further conveying device then also have a corresponding arrangement. Such an arrangement offers the essential advantage that the entire density separation device as such can be designed more compactly. In addition, such an arrangement in combination with the preferred arrangement of the flow generator below and/or in the separation chamber enables the upstream flow through and/or for the flow generator to be kept stable.

The opposite arrangement of the conveying directions of the conveying device and the further conveying device can also ensure a reduced width compared to systems known from the prior art. Ultimately, although this design increases the total length of the density separation device compared to density separation devices known from the prior art, the width of the density separation device according to the invention is reduced compared to the width of devices known from the prior art. In the prior art, the conveying direction of the conveying device is orthogonal to the conveying direction of the further conveying device, which leads to a relatively large width of the density separation device. This can lead to the fact that it is not possible to transport the known density separation device in its completely assembled state over normal transport routes, for example over the road. According to the invention, this problem is avoided by the fact that the conveying directions of the conveying device and the further conveying devices run in opposite directions, which ultimately leads to a reduction in the overall width of the fully assembled system.

In a further preferred embodiment, it is provided that the receiving chamber and/or the separation chamber are arranged and designed in such a way that the flow path of the light material fraction from the receiving chamber into the separation chamber is deflected, in particular by 90°+/−20°. After the light material fraction has been diverted into the separation chamber, it can then be conveyed away along the additional conveying device. The conveying direction of the further conveying device can also be designed in such a way that, if necessary, a further deflection can take place in relation to the flow path.

In a particularly preferred embodiment, a suction device is provided, which is designed for the suction and/or intake of dirty water from the receiving chamber and/or from the separation chamber, wherein density measurement sensors in particular are assigned to the suction device. The suction device can thus be used to extract water that is highly contaminated. These impurities could influence the selectivity of the density of the system according to the invention. Accordingly, it may also be alternatively or additionally provided that a supply device is provided for supplying, preferably purified, fresh water into the receiving chamber and/or into the separation chamber. The fresh water can be provided by treating the dirty water or separately. In particular, the inlet opening of the supply device is provided below and/or in the area of the shaft.

The degree of purity of the water provided in the density separation device can also be controlled and, in particular, adjusted by means of the supply device.

In a particularly preferred embodiment, a separating means, in particular a separating plate, is arranged at least in some areas between the receiving chamber and the conveyor housing. The separating means can thus separate the area of the conveyor housing from the receiving chamber.

In another particularly preferred embodiment, it is provided that the flow velocity of the flow generator is adjustable. By adjusting the flow velocity of the flow generator, the degree of separation of the light material fraction to be separated can also be changed or adjusted, in particular the maximum density of the components of the light material fraction can thus be varied.

Preferably, in a further preferred embodiment, an overflow device is provided for the receiving chamber and/or the separation chamber, in particular an overflow channel. The overflow device can then be designed to collect water.

Preferably, a measuring device, in particular one with level sensors, is provided for measuring the water level in the receiving chamber and/or the separation chamber. This measuring device can preferably be connected to the feed device via a control device or alternatively or additionally to the suction device. In this way, when a correspondingly high or low water level is detected, a corresponding supply and/or discharge of water from the suction device can be ensured.

In particular, the density measurement sensors can also be assigned to a control device and, in particular, coupled with the level sensors, wherein the measurement results can be evaluated, in particular by the control device. If necessary, an alarm can also be given.

The light material fraction has in particular components with a maximum density which is preferably slightly higher than the density of water and in particular between 1020 to 1300 kg/$m^3$, preferably between 1100 to 1250 kg/$m^3$.

Furthermore, the present invention also relates to a method for separating feed material using a hydraulic density separation device of the aforementioned type. The method comprises the following steps, which are preferably carried out in succession:

- Provision of a hydraulic density separation device according to at least one of the embodiments described above,
- Introduction of water at least into the receiving chamber, if necessary also into the separation chamber,
- Feeding of feed material into the receiving chamber,
- Providing a water flow by the flow generator so that a water flow is generated which leads from the receiving chamber into the separation chamber, whereby the light material fraction is transferred from the receiving chamber into the separation chamber,
- Discharging the heavy material fraction via the conveying device and washing the heavy material fraction in the at least one washing section,
- if necessary, conveying away the light material fraction via the further conveying device.

In connection with advantages and preferred embodiments of the process according to the invention, it is understood that reference can be made to the aforementioned explanations on the hydraulic density separation device, which also apply in the same way to the process according to the invention, without this requiring any further explicit mention. Also, the explanations on the process can apply in the same way to the hydraulic density separation device.

During operation of the density separation device, the flow generator in particular is active and is fed with water, preferably water from the separation chamber. The flow generator is arranged in a flow tube which, if necessary, has an opening for feeding water into the flow tube. The water made available to the receiving chamber via the flow generator flows out of the flow tube via an outflow opening into the receiving chamber. Preferably, the water is circulated. During the operation of the density separation device and thus during the process according to the invention, the conveying device rotates so that the heavy material fraction can also be conveyed away via the conveying device.

A separation of the feed material takes place via a density separation process, which can take place via the water provided in the density separation device, in particular wherein the heavy material fraction with its components sinks to the bottom of the receiving chamber and/or into the lower area of the receiving chamber, from which it can be collected and conveyed away via the conveyor device.

The light material fraction, which may also contain components with a slightly higher density than water, is transported to the upper area of the receiving chamber via the buoyancy effect, which is also supported by the water flow provided by the flow generator. This water flow then enables the light material fraction to be transferred with the water flow, in particular via the weir, into the separation chamber.

In the separation chamber, the light material fraction can then be conveyed away via the additional conveying device. This can vibrate and/or shake during operation of the density separation device and thus enable the discharge.

During the operation of the density separation device, the conveying device and/or the further conveying device can be arranged at least partially in the water, in particular wherein the sections of the conveying device and/or the further conveying device provided in the region of the respective discharge end are arranged outside the water in order to avoid or at least reduce water losses.

Preferably, the washing sections are arranged at least substantially completely or at least regionally in the water.

The feed of the material can be discontinuous or continuous. This can be done either by an excavator or by a conveyor belt or the like. Finally, the feed material is brought into the receiving chamber, wherein the heavy components of the heavy material fraction sink and the light material fraction rises due to the buoyancy.

Furthermore, it is expressly pointed out that all the above-mentioned and following intervals contain all the intermediate intervals and also individual values contained therein and that these intermediate intervals and individual values are to be regarded as essential to the invention, even if these intermediate intervals or individual values are not specifically stated in detail.

Further features, advantages and possible applications of the present invention will be apparent from the following description of examples of embodiments based on the drawing and the drawing itself. All the features described and/or illustrated constitute the subject-matter of the present invention, either individually or in any combination, irrespective of their summary in the claims or their correlation.

DETAILED DESCRIPTION

Figure 1:
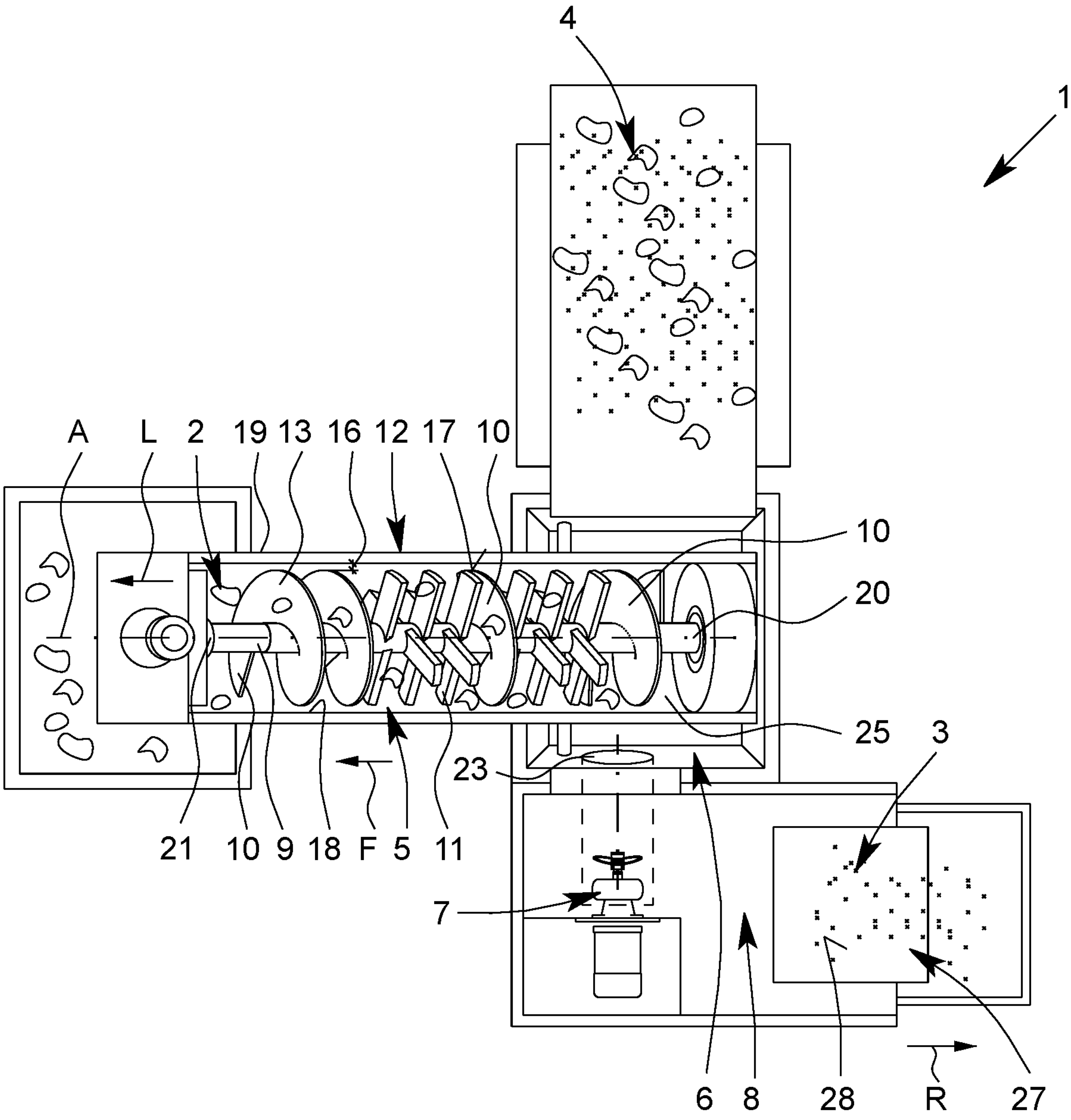
FIG. 1 is a schematic top view of a hydraulic density separation device according to the invention.
Figure 17:
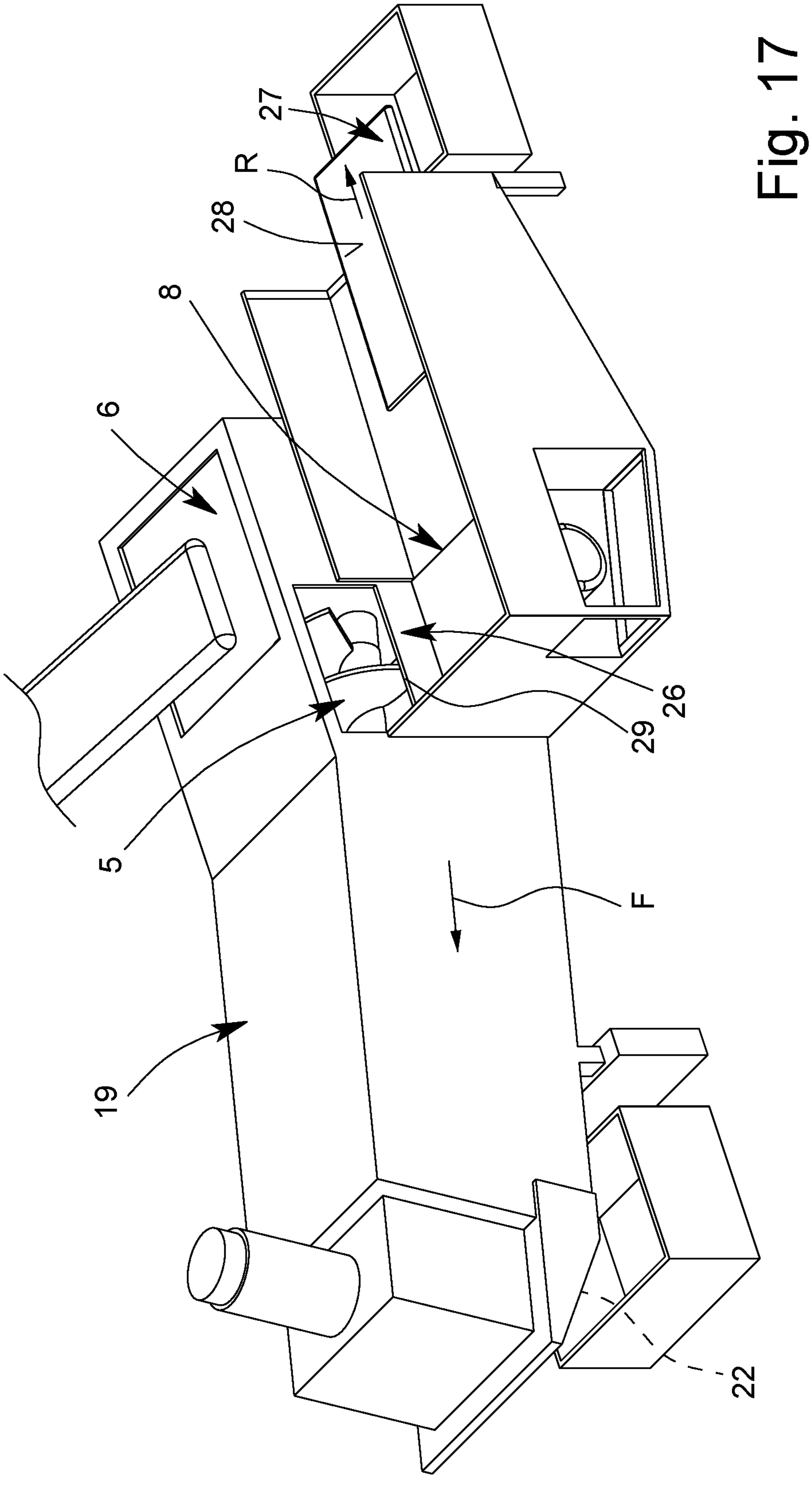
FIG. 17 is a schematic perspective view of a further embodiment of a density separation device according to the invention.

FIGS. 1 and 17 show different embodiments of a hydraulic density separation device 1. The density separation device 1 is intended for separating a heavy material fraction 2 with components of higher density from a light material fraction 3 with components of lower density from a feed material 4. FIG. 1 shows the feed material 4, which can be separated into the heavy material fraction 2 and the light material fraction 3. The fractions 2, 3 are not shown in detail in FIG. 17 and in the other figures for reasons of clarity.

It is understood that water has been introduced into the density separation device 1 for its operation. However, the water or the water level is not shown in more detail in the embodiments shown.

The density separation device 1 comprises a conveying device 5 for conveying away the heavy material fraction 2, as shown in FIG. 1. In addition, FIG. 1 shows that the density separation device 1 has a receiving chamber 6 which can be filled with water to receive the feed material 4. FIG. 1 further shows that the feed material 4 is fed into the receiving chamber 6. Feeding can be carried out by a conveyor belt, as shown schematically in FIG. 1, or by other feeding means, such as an excavator. Also, the feeding of the feed material 4 can take place continuously or discontinuously.

In this context, it is understood that during operation the receiving chamber 6 is at least partially filled with water, the water itself being used for the separation process. Thus, the components of the heavy material fraction 2, which have a significantly higher density than the water, sink to the bottom of the receiving chamber 6 and are conveyed away by the conveying device 5. The light material fraction 3, which has components with lower or the same density as water or even slightly higher density than water, rises due to the buoyancy. Thus, the components are hydraulically separated on the basis of their density.

Figure 3:
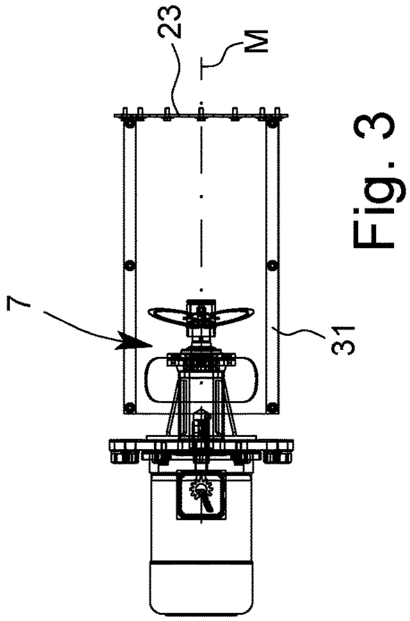
FIG. 3 is a schematic sectional view of a flow generator.

FIG. 1 further shows that the density separation device 1 has a flow generator 7 for generating a water flow in the receiving chamber 6. The flow generator 7 can be assigned to the receiving chamber 6, but does not have to be arranged in it, as can be seen in FIG. 1. In the example shown in FIG. 1, the flow generator 7 is arranged in a flow tube 31, which is shown in more detail in FIGS. 3 and 4, for example. FIG. 3 shows the flow tube 31 and the flow generator 7 arranged therein. The flow tube 31 can thus protect the flow generator 7 from external mechanical damage. The outflow opening 23 of the flow tube 31 can open into the receiving chamber 6, as shown in more detail in FIG. 15.

In addition, the density separation device 1 comprises a separation chamber 8 which can be filled with water to receive the light material fraction 3. The separation chamber 8 can also serve to supply water for the flow generator 7, in particular to implement a closed flow circuit—but it does not have to.

FIG. 1 shows that the conveying device 5 has a shaft 9 with at least one screw conveyor section 10 for conveying the heavy material fraction 2 out of the receiving chamber 6. The conveying device 5 is at least partially arranged in the receiving chamber 6.

Figure 6:
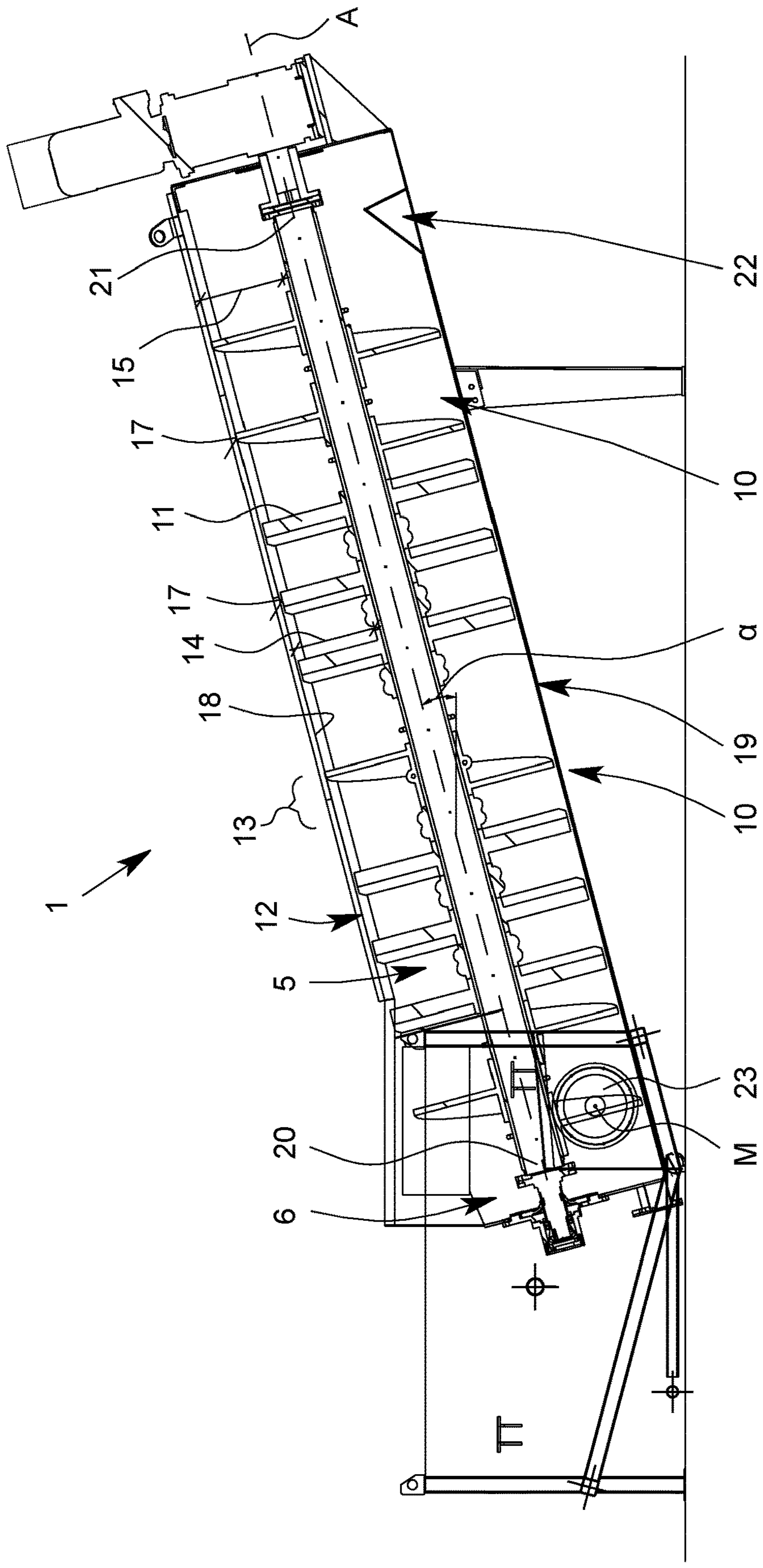
FIG. 6 is a schematic sectional view of a further design form of a hydraulic density separation device according to the invention.

The further section of the conveying device 5, which can also be arranged in the water, can be arranged in a conveyor housing 19, which is shown in more detail in FIG. 6, for example. Water can also be present and/or partially filled with water in the feed housing 19 during operation of the density separation device 1.

The flow generator 7 shown in FIG. 1 is designed and arranged in such a way that a flow path of the water flow leads from the receiving chamber 6 into the separation chamber 8. This flow path leads in particular to the light material fraction 3 being guided from the receiving chamber 6 into the separation chamber 8 via this water flow.

Furthermore, FIG. 1 shows that the conveying device 5 has, in addition to the screw conveyor section 10, at least one washing section 12 having a plurality of paddles 11 arranged on the shaft 9.

Figure 5:
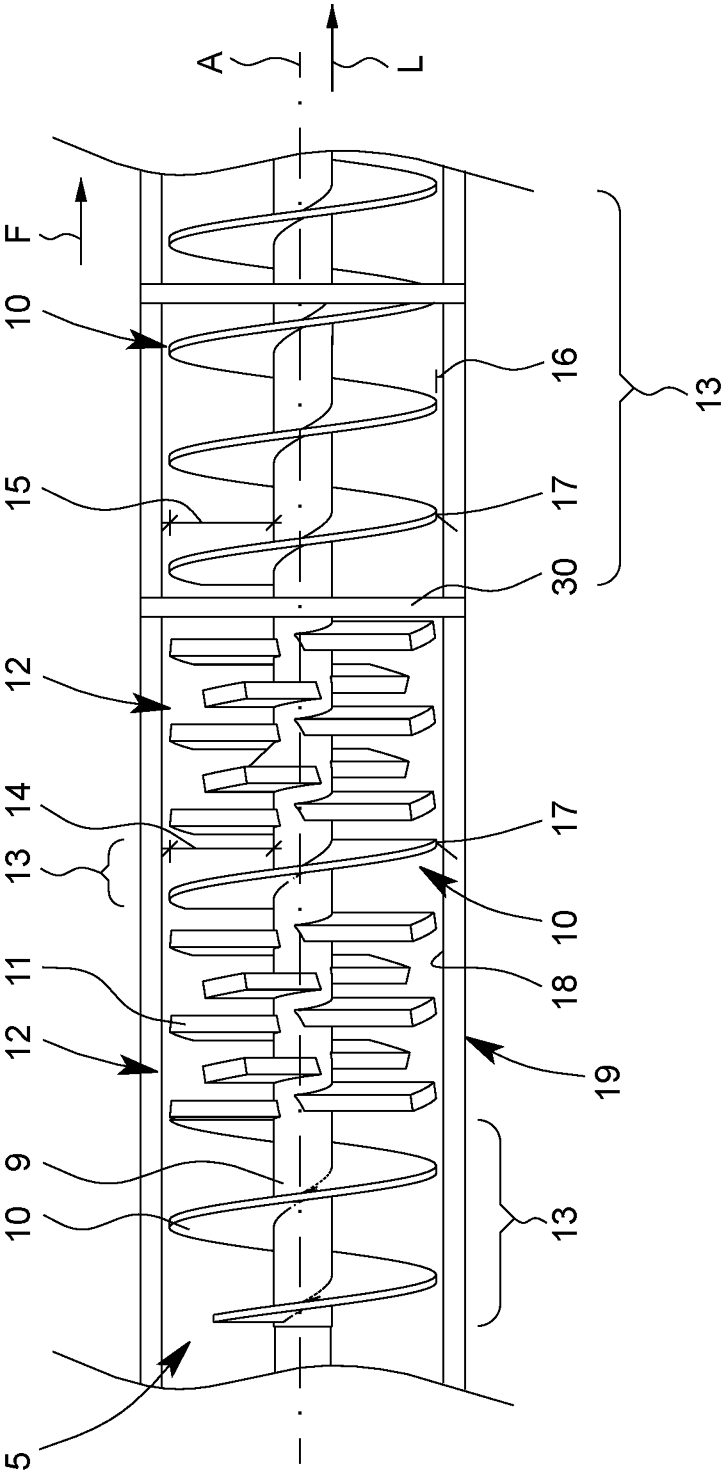
FIG. 5 is a schematic sectional view of a conveying device.

In FIG. 5 the washing section 12 is shown with different or separate paddles 11. In further embodiments, the paddles 11 can be arranged on the shaft 9 in such a way that they preferably follow the spiral line of at least one adjacent screw conveyor section 10. However, this is not shown in more detail in the figures.

Finally, the paddles 11 may be arranged around the circumference of the shaft 9 in the area of the washing section 12 and serve at least for washing and cleaning the heavy material fraction 2. In further embodiments, but not shown in more detail, the paddles 11 are arranged in the washing section 12 such that they are aligned to follow the helix of the adjacent screw conveyor section 10, as explained previously. In particular, the helix and/or the helix pitch of the winding 13 of all screw conveyor sections 10 is at least substantially the same.

FIG. 5 shows that the paddles 11 are arranged at a distance from each other and can thus also be provided separately from each other. The paddles 11 are in particular firmly connected to the shaft 9.

Figure 2:
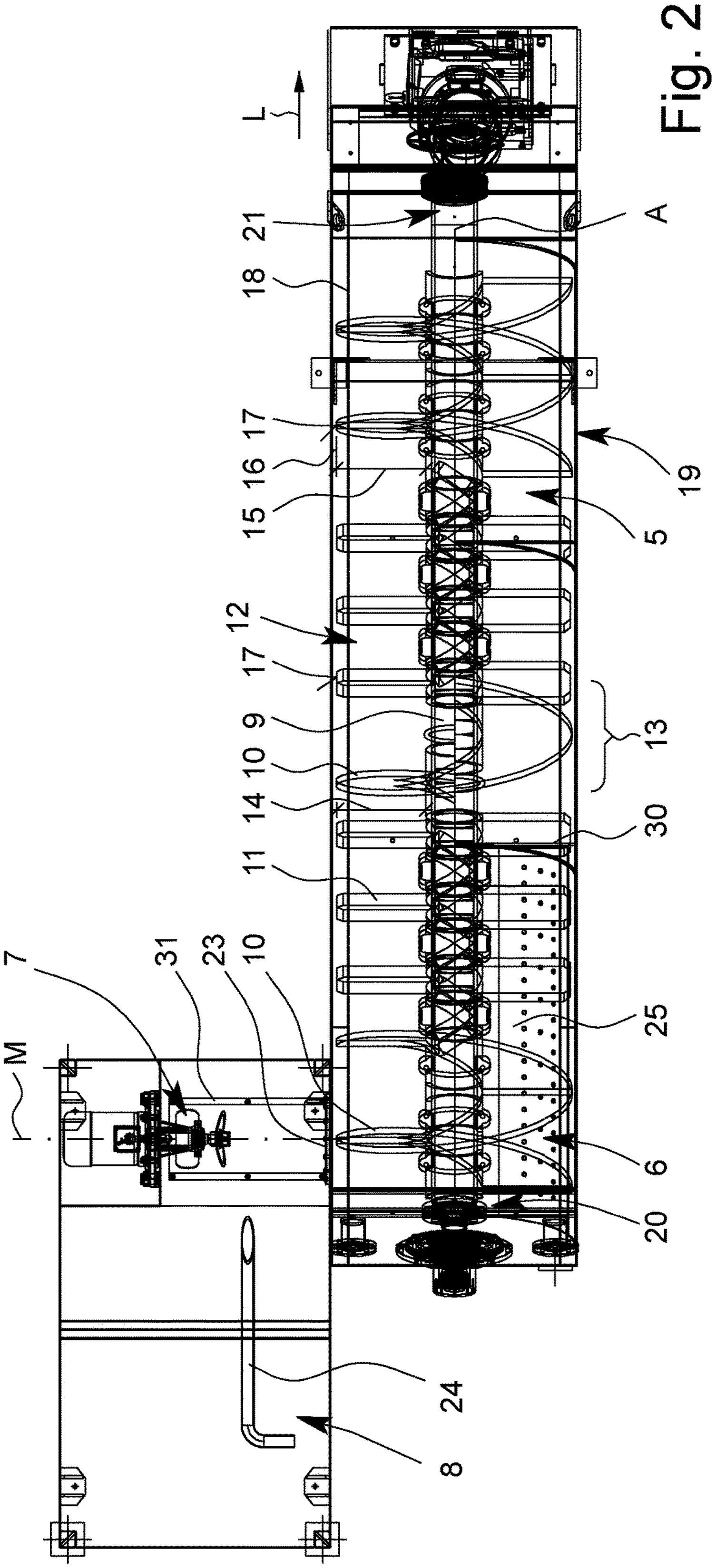
FIG. 2 is a schematic sectional view of a further embodiment of a hydraulic density separation device according to the invention.

FIG. 2 shows that a plurality of screw conveyor sections 10 is provided, wherein a washing section 12 is arranged between two adjacent screw conveyor sections 10. Furthermore, FIG. 2 shows that a plurality of washing sections 12 is also provided, in particular wherein the screw conveyor sections 10 and the washing sections 12 are arranged alternately to each other. In any case, a screw conveyor section 10 should be provided at the beginning of the shaft 9 and also at its end.

The washing section 12 can have differently designed paddles 11 or a different number of paddles 11 depending on the desired cleaning result. In particular, it is envisaged that a washing section 12 has between 4 and 24 paddles 11, as shown in more detail in FIG. 5.

Figure 14:
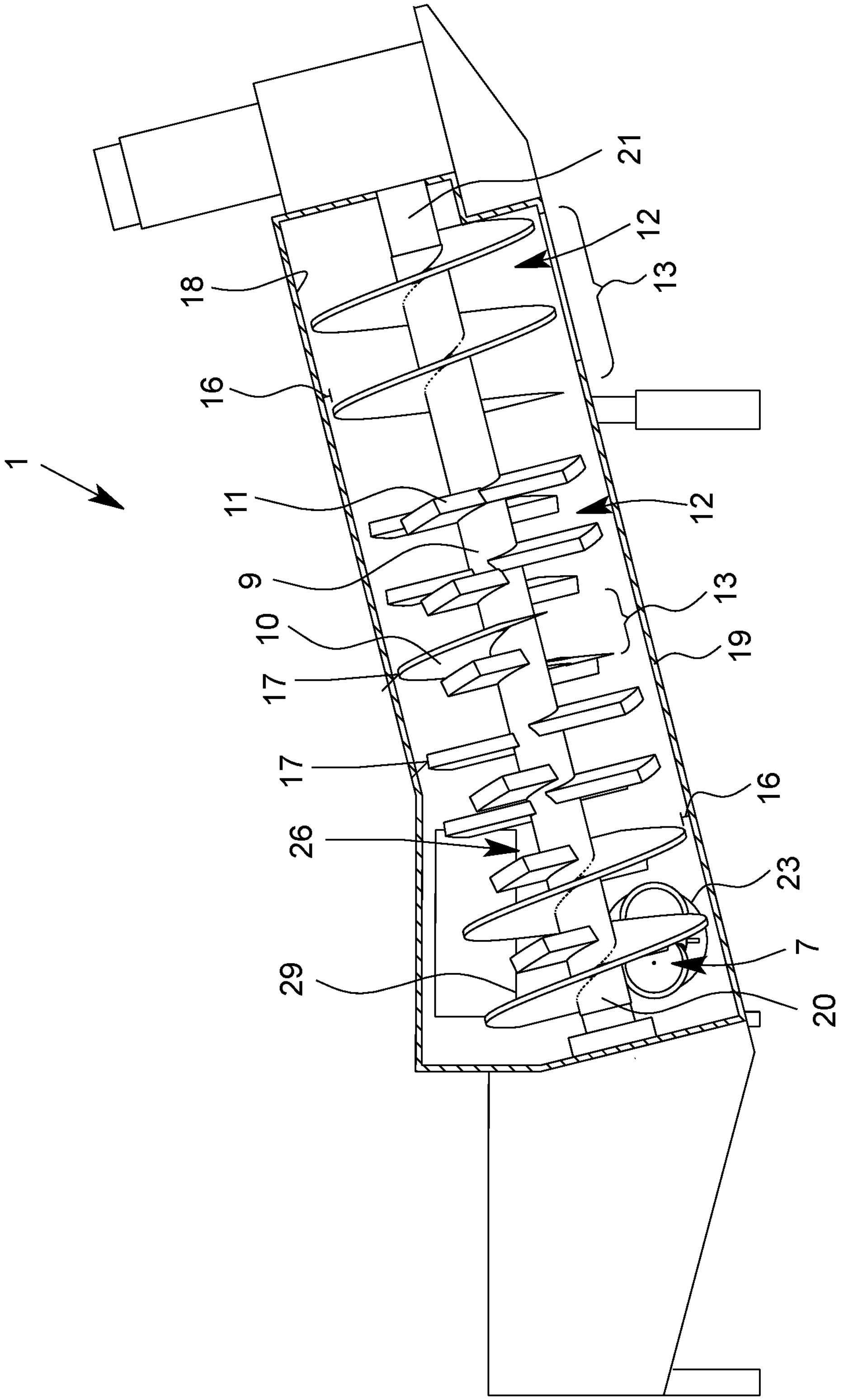
FIG. 14 is a schematic sectional view of a further embodiment of a hydraulic density separation device according to the invention.

In FIG. 14, it is shown that the screw conveyor section 10 comprises a helix forming a winding 13. The winding 13 may extend over a range between 360° to 1440°. FIG. 14 further shows that different windings 13 of the screw conveyor sections 10 are provided. For example, the screw conveyor section 10 provided in the central area of the shaft 9 extends at least substantially over approximately 360°, whereas the outer screw conveyor sections 10 each have a winding 13 that is greater than 360° and lies between 360° and 720°.

It is not shown in detail that adjacent washing sections 12 can have a different number of paddles 11. Also, the paddles 11 of adjacent washing sections 12 may have different designs.

As explained above, FIG. 14 shows, for example, that adjacent screw conveyor sections 10 have differently designed windings 13.

It is not shown in more detail that the helix pitch of adjacent screw conveyor sections 10 can also be designed differently.

The paddles 11 are in particular arranged at an angle on the shaft 9 in such a way that a material transport of the heavy material fraction 2 in the conveying direction F of the shaft 9 also takes place in the area of the respective washing section 12.

FIG. 5 shows that a plurality of paddles 11 is arranged one behind the other in relation to the longitudinal direction L of the shaft 9 and a plurality of paddles 11 is arranged one behind the other in the circumferential direction of the shaft 9.

It can be seen schematically from FIG. 6 that the radial paddle length 14 is at least substantially equal to the web height 15 of the winding 13 of at least one adjacent screw conveyor section 10. In particular, the web height 15 of all screw conveyor sections 10 is constant, wherein the radial paddle length 14 of all paddles 11 of the conveyor device 5 can also be constant. The distance 16 between the outermost upper edge 17 of the winding 13 and of the paddle 11 and an adjacent housing wall 18 of the conveyor housing 19 can also preferably be constant over the length of the shaft 9 and in particular be between 100 and 200 mm.

FIG. 6 also shows an angle $\alpha$ between the centre axis A of the shaft 9 and the ground and/or a line running parallel to the ground. This angle $\alpha$ can be between 10° and 70°, preferably between 12° and 20°.

Furthermore, FIG. 6 shows that the shaft 9 is mounted with its one shaft end 20 in the area of the receiving chamber 6 and with its other shaft end 21 in the area of the discharge opening 22 of the heavy material fraction 2. The position can be provided in such a way that a rotation of the shaft 9 is possible. In the area of the discharge opening 22, a support of the conveyor housing 19 can also be provided, as schematically shown in FIG. 6.

Figure 8:
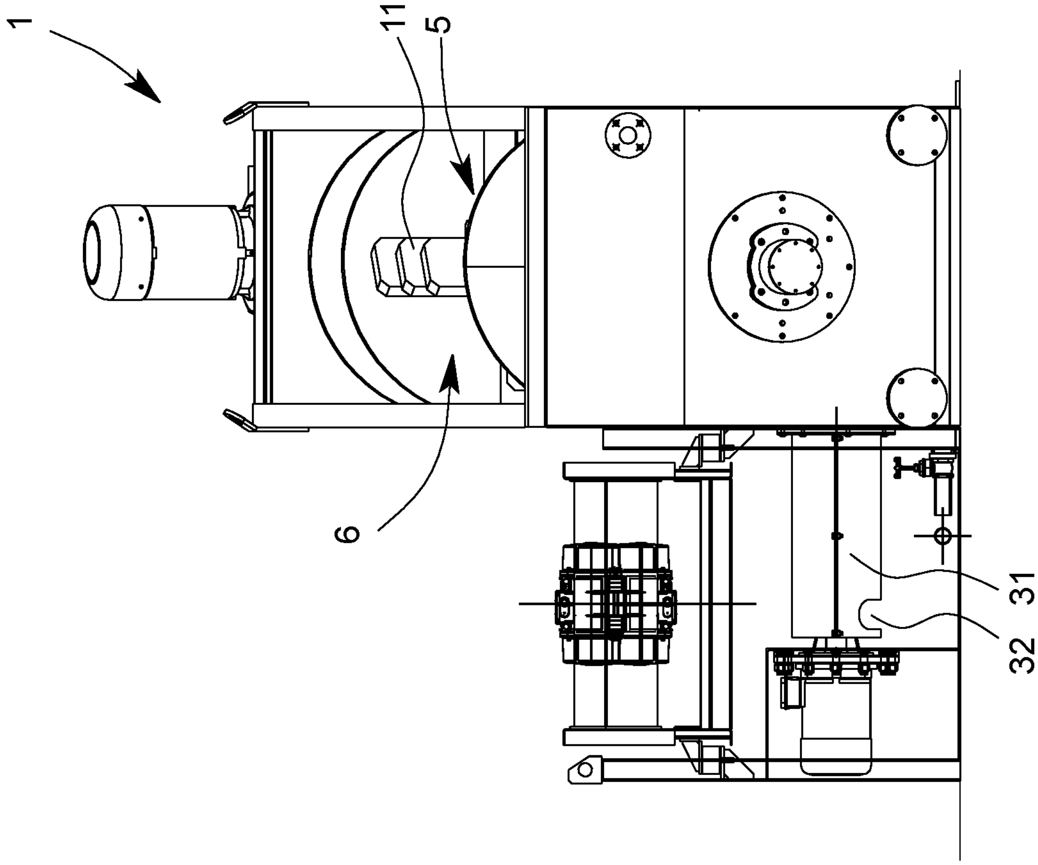
FIG. 8 is a further side view of the hydraulic density separation device shown in FIG. 6.
Figure 7:
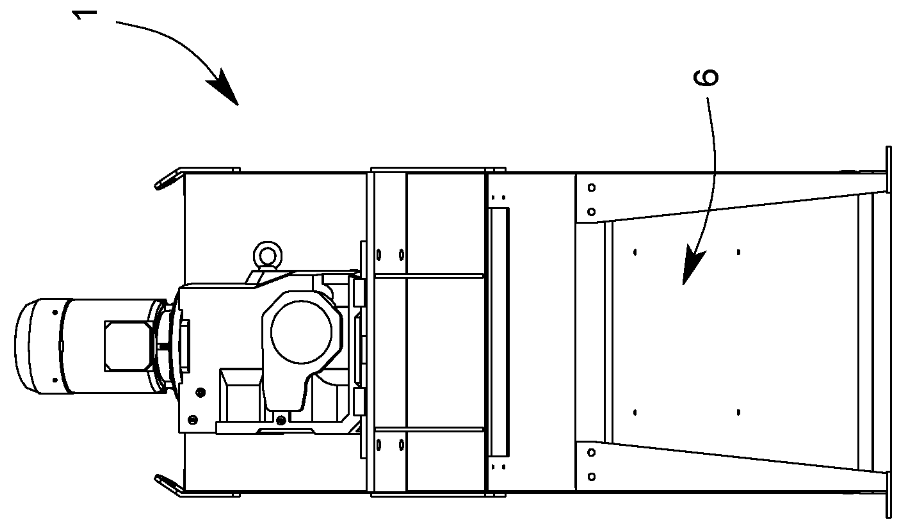
FIG. 7 is a schematic side view of the hydraulic density separation device shown in FIG. 6.
Figure 9:
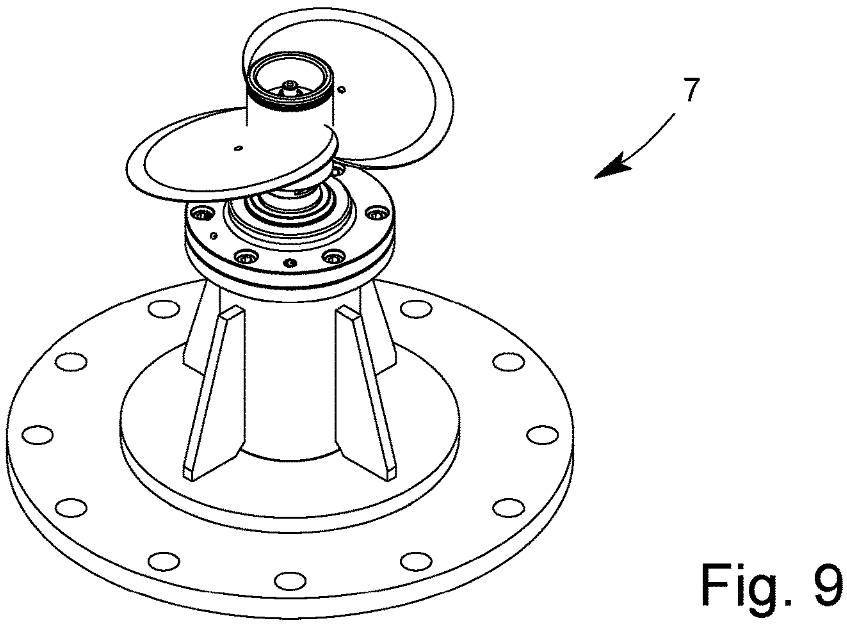
FIG. 9 is a schematic perspective view of a flow generator.
Figure 10:
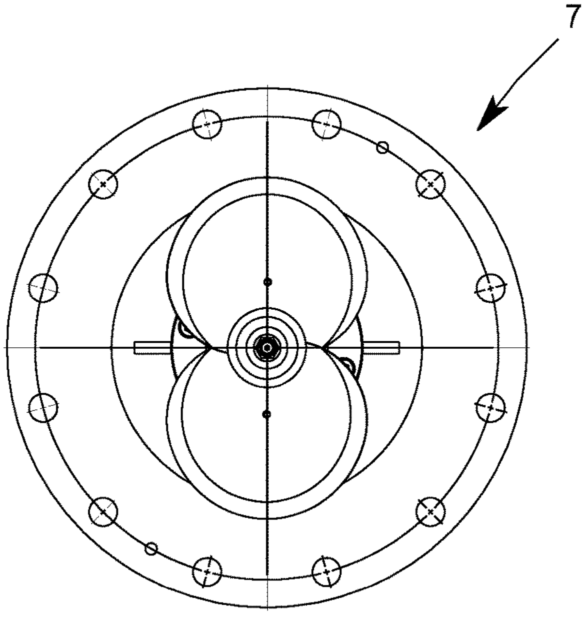
FIG. 10 is a schematic top view of the flow generator shown in FIG. 9.
Figure 11:
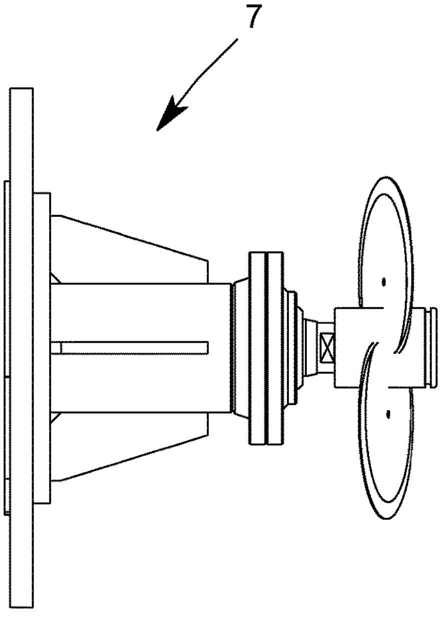
FIG. 11 is a schematic side view of the flow generator shown in FIG. 9.
Figure 12:
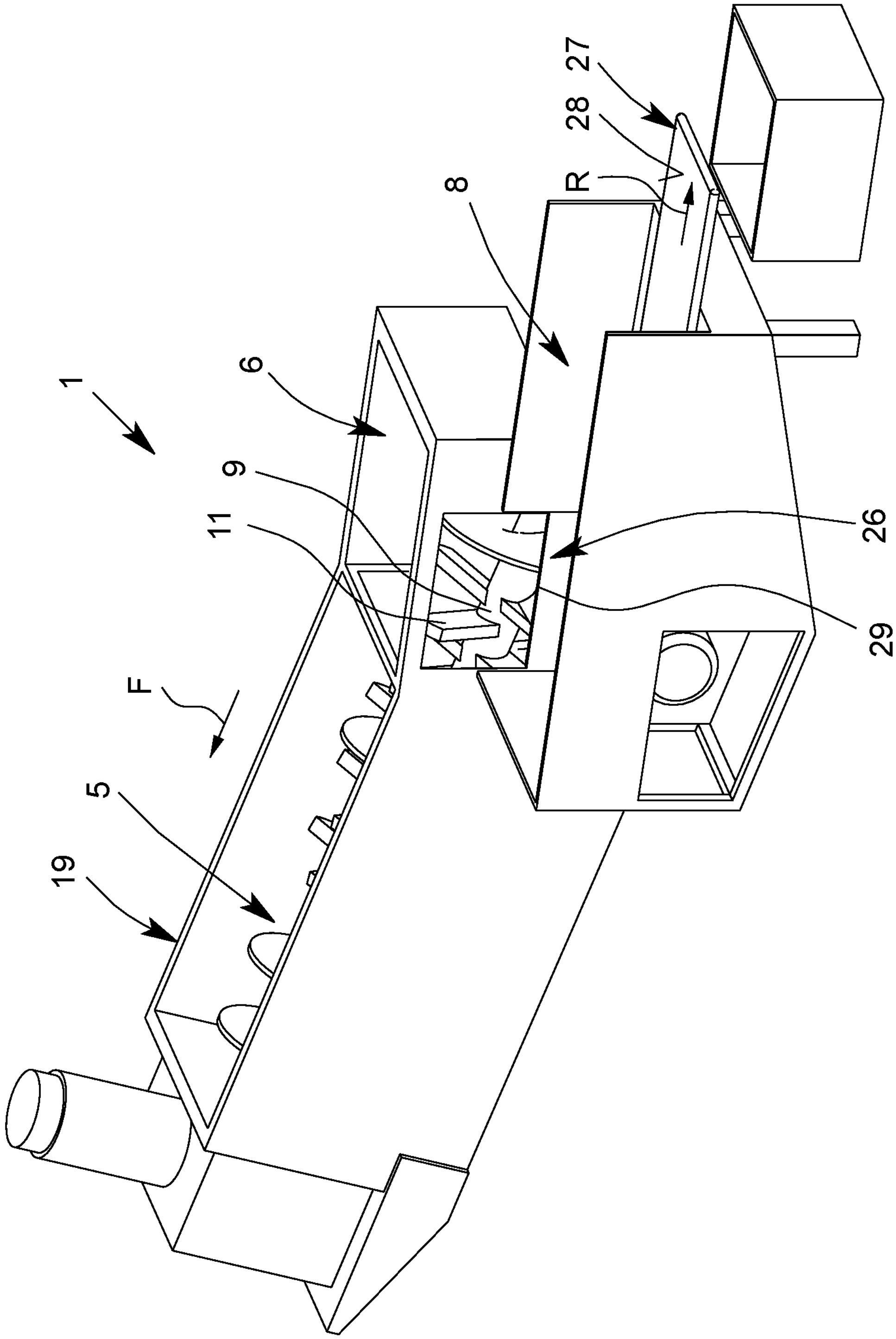
FIG. 12 is a schematic perspective view of a further embodiment of a hydraulic density separation device according to the invention.

FIGS. 7 and 8 show different side views of the sealing device and also the arrangement of the opening 32.

Figure 13:
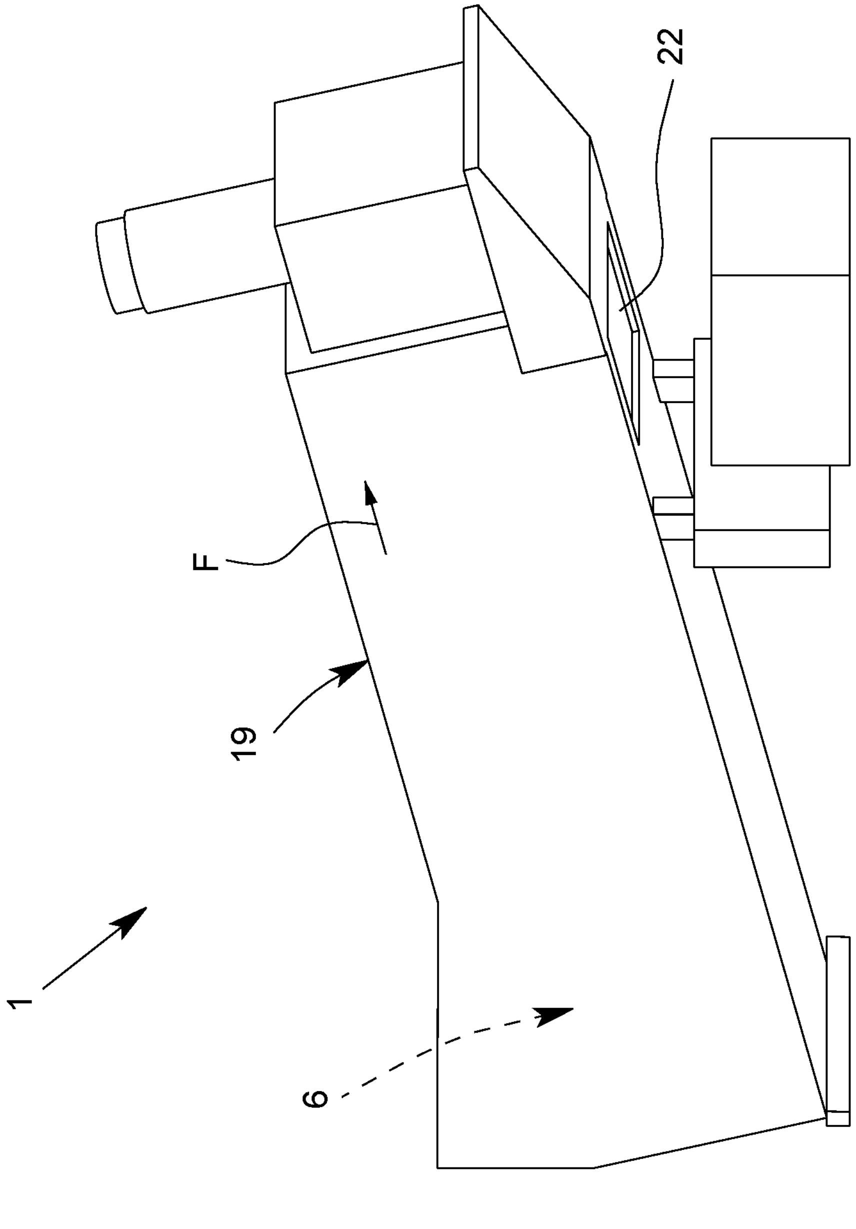
FIG. 13 is a schematic perspective side view of a further embodiment of a hydraulic density separation device according to the invention.

FIG. 13 schematically shows that the heavy material fraction 2 can be discharged from the conveyor housing 19 via a discharge opening 22.

In FIG. 14 only a section is shown, namely the conveyor housing 19, so that in particular the arrangement of the conveyor device 5 becomes apparent.

Figure 15:
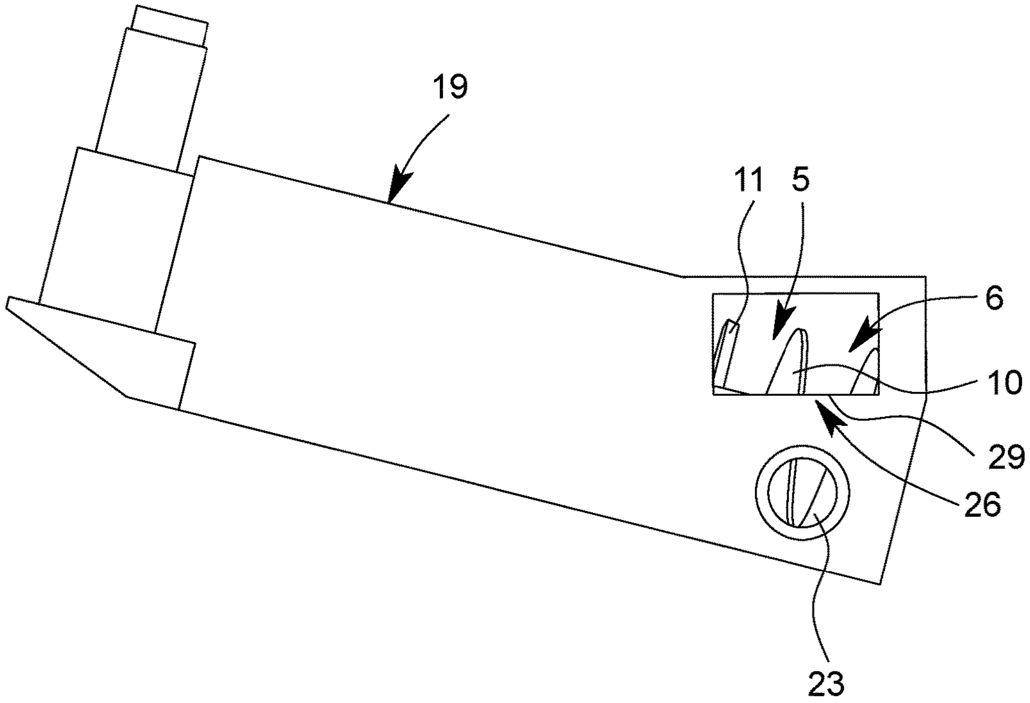
FIG. 15 is a schematic side view of a conveyor housing and a receiving chamber.
Figure 16:
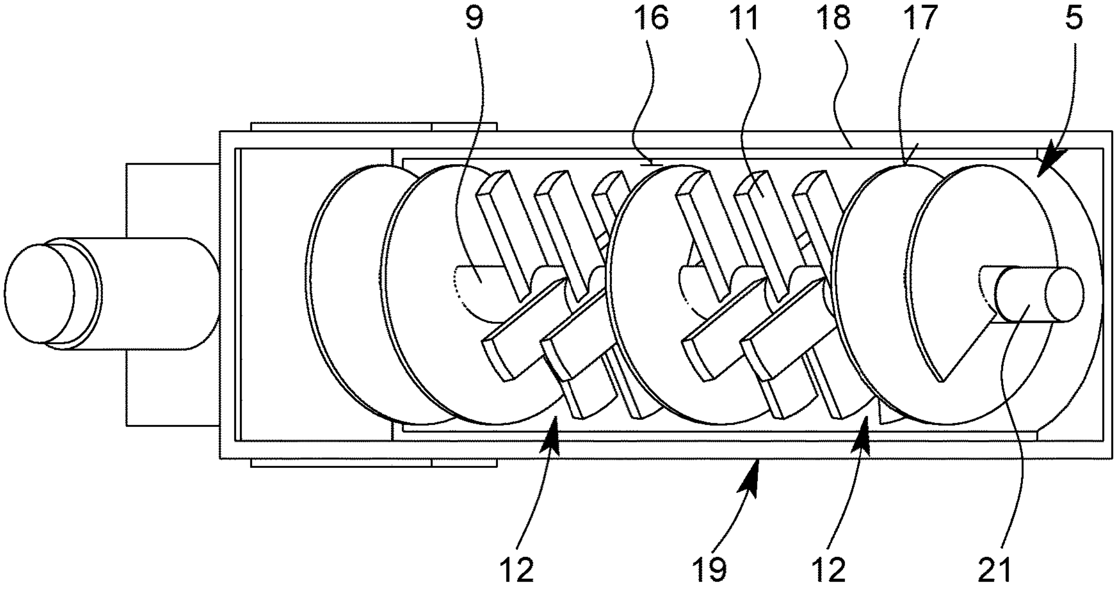
FIG. 16 is a schematic perspective view of a further embodiment of a conveyor housing.

FIG. 15 shows the density separation device 1 without the separation chamber 8, so that a weir 26 and an outflow opening 23 are visible in relation to the conveyor device 5.

As previously explained, FIG. 15 in particular illustrates that the outflow opening 23 of the flow generator 7 opens into the receiving chamber 6. This outflow opening 23 can preferably be formed by the end opening of the flow tube 31 in which the flow generator 7 is arranged.

Figure 4:
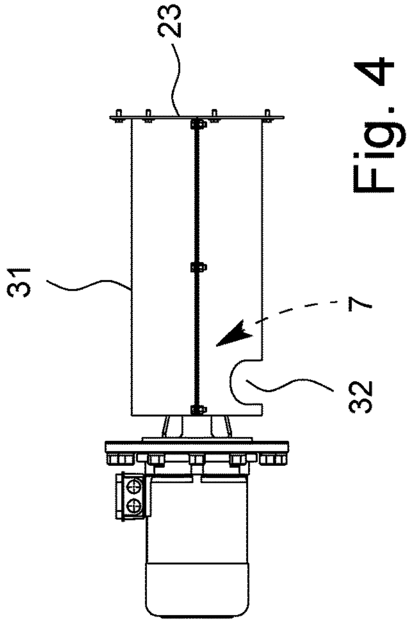
FIG. 4 is a schematic side view of a flow tube.

FIG. 2 shows that the separation chamber 8 is designed as a suction chamber for the flow generator 7, wherein a suction pipe 24 is assigned to the flow generator 7 in the embodiment example shown in FIG. 2, which is arranged at least in some areas in the separation chamber 8 for the suction of water located in the separation chamber 8. The suction pipe 24 does not have to be directly connected to the flow tube 31, as can also be seen in FIG. 2. Finally, the flow generator 7 can draw in the water that can be made available to the flow generator 7 from the separation chamber 8 via the suction pipe 24 through an opening 32 of the flow tube 31, as shown in FIG. 4.

FIG. 2 shows schematically that the receiving chamber 6 has a curved deflection area 25 for the water flow at least in the area opposite the outflow opening 23 and/or below the shaft 9. The curved deflection area 25 can in particular be formed as a segment/cutout of a cylinder jacket.

Furthermore, FIG. 6 shows that the centre axis M of the outflow opening 23 runs below the centre axis A of the shaft 9.

FIG. 17 shows schematically that the weir 26 is arranged between the receiving chamber 6 and the separation chamber 8, in particular whereby the flow path for the light material fraction 3 runs from the upper region of the receiving chamber 6 via the weir 26 into the separation chamber.

In addition, FIG. 17 shows that a further conveying device 27 is provided for conveying the light material fraction 3, which is associated with the separation chamber 8. The further conveying device 27 can be arranged at least in some areas in the separation chamber 8, and in particular can also be arranged in the water in some areas during operation of the density separation device 1. The further conveying device 27 can have a shaking and/or vibrating screen. The conveying level 28 of the further conveying device 27 can run at least in some areas below the upper edge 29 of the weir 26, which is shown schematically in FIG. 17.

Furthermore, FIG. 17 shows that the conveying direction R of the further conveying device 27 runs at least essentially opposite to the conveying direction F of the conveying device 5.

Furthermore, FIG. 17 shows that the receiving chamber 6 and the separation chamber 8 are arranged and designed in such a way that the flow path of the light material fraction 3 in the separation chamber 8 is deflected, in particular by 90°+/−20°.

It is not shown in more detail that a suction device can be provided, which is designed to suck off and/or suck in dirty water from the receiving chamber 6 and/or the separation chamber 8, in particular wherein density measurement sensors are assigned to the suction device. It is also not shown in more detail that a feed device is provided for feeding fresh water into the receiving chamber 6, in particular wherein the inflow opening of the feed device is provided below and/or in the region of the shaft 9.

FIG. 2 shows a separating means 30, which can preferably be designed as a separating plate and is preferably arranged at least in some areas between the receiving chamber 6 and the conveyor housing 19. In principle, a plurality of separating means 30 can also be arranged in the conveyor housing 19.

The conveyor housing 19 can be designed to be watertight in the water-bearing area.

It is not shown in more detail that the flow velocity of the flow generator 7 is adjustable, in particular for varying the degree of separation of the density of the components of the light material fraction 3.

Also not shown in more detail is that an overflow device may be provided for the receiving chamber 6 and/or separation chamber 8, which may for example be an overflow chute. In addition, a control device can be provided which can interact either with the density measurement sensors and/or the level sensors in the receiving chamber 6. This control device can be used to control the operation of the density separation device 1 as required.

The method according to the invention uses the density separation device 1 shown in the figures, which is filled with water for operation, so that the receiving chamber 6 and, if required, also at least in some areas the separation chamber 8 are filled with water.

The feed material 4 can then be fed in, for example via conveyor belts or via an excavator shovel.

The operation of the flow generator 7 then generates a water flow in the receiving chamber 6, which leads from the receiving chamber 6 into the separation chamber 8 and in particular leads to the entrainment of the light material fraction 3, wherein the light material fraction 3 can thus be led from the receiving chamber 6 into the separation chamber 8. Due to the gravitational effect, the components of the heavy material fraction 2 sink into the lower area of the receiving chamber 6 and are conveyed away via the conveyor 5.

The components of the light material fraction 3 rise due to the buoyancy effect and are also carried along by the water flow. The density of the components of the light material fraction 3 can be lower than the density of the water used or only slightly higher than the density of the water used. Preferably, the light material fraction 3, together with water, is led over the weir 26 into the separation chamber 8.

In particular, a closed water circuit is provided so that the water in the separation chamber 8 can be made available again to the receiving chamber 6 via the flow generator 7. However, it can also be provided that fresh water is always supplied to the receiving chamber 6.

The light material fraction 3 can preferably be conveyed away via the further conveying device 27, in particular wherein this is designed as a shaking and/or vibrating screen.

The heavy material fraction 2 is both conveyed away by the conveying device 5 and cleaned and/or washed in the area of the washing sections 12. The residual fraction, which is separated from the heavy material fraction 2 in the area of the washing sections 12, can in particular dissolve in the water or remain in the water in the conveyor housing 19 and, for example, be discharged by draining the water from the conveyor housing 19 after switching off the density separation device 1.

The separated heavy material fraction 2 is at least substantially freed from the residual fraction by the cleaning in the washing sections 12 and has in particular a high degree of purity.

However, the separation process between the heavy material fraction 2 and the light material fraction 3 does not take place in the area of the conveyor housing 19, but in the receiving chamber 6. In the area of the conveyor housing 19 and thus also through the washing sections 12, only a cleaning of the heavy material fraction 2 takes place and no separation of the light material fraction 3. The light material fraction 3 is thus not affected by the residual fraction of the heavy material fraction 2 loosened up by the washing sections 12.

LIST OF REFERENCE SIGNS

1 Density separation device
2 Heavy material fraction
3 Light material fraction
4 Feed material
5 Conveying device
6 Receiving chamber
7 Flow generator
8 Separation chamber
9 Shaft
10 Screw conveyor section
11 Paddle
12 Washing section
13 Windings
14 Paddle length
15 Web height
16 Distance
17 Top edge
18 Housing wall
19 Conveyor housing
20 Shaft end
21 Other shaft end
22 Discharge opening
23 Outflow opening
24 Suction pipe
25 Deflection area
26 Weir
27 Further conveyor
28 Conveying level of 27
29 Upper edge of 26
30 Separating means
31 Flow tube
32 Opening in 31
F Conveying direction of 5
L Longitudinal direction of 9
M Central longitudinal axis of 23
A Central longitudinal axis of 9
R Conveying direction from 22
$\alpha$ Angle

The invention claimed is:

1. A hydraulic density separation device for separating a heavy material fraction with components of higher density from a light material fraction with components of lower density from a feed material, comprising:

a conveying device for conveying away the heavy material fraction;

a receiving chamber which can be filled with water for receiving the feed material;

a flow generator for generating a water flow in the receiving chamber; and a water-fillable separation chamber for receiving the light material fraction;

wherein the conveying device has a shaft with at least one screw conveyor section for conveying the heavy material fraction out of the receiving chamber;

wherein the flow generator is designed and arranged in such a way that a flow path of the water flow leads from the receiving chamber into the separation chamber;

wherein the conveying device has, in addition to the screw conveyor section, at least one washing section having a plurality of separate paddles arranged on the shaft;

wherein a feed device is provided for feeding fresh water into the receiving chamber and/or into the separation chamber; and wherein an inflow opening of the feed device is provided below and/or in a region of the shaft.

2. The hydraulic density separation device according to claim 1, wherein a plurality of screw conveyor sections is provided, a washing section being arranged between two adjacent screw conveyor sections; and/or wherein a plurality of washing sections is provided, with the screw conveyor sections and the washing sections being arranged alternately with respect to one another.

3. The hydraulic density separation device according to claim 1, wherein the washing section comprises one of the following: between 2 and 52 paddles, between 4 and 36 paddles, and between 12 and 24 paddles.

4. The hydraulic density separation device according to claim 1, wherein the winding of the screw conveyor section extends over a range between 360° and 1440°.

5. The hydraulic density separation device according to claim 2, wherein adjacent washing sections have a different number of paddles and/or differently formed and/or arranged paddles and/or wherein adjacent screw conveyor sections have differently formed windings.

6. The hydraulic density separation device according to claim 1, wherein the paddles are arranged at an angle on the shaft in such a way that a material transport of the heavy material fraction in the conveying direction of the shaft also takes place in the region of the respective washing section, and/or wherein a plurality of paddles are arranged one behind the other in relation to a longitudinal direction of the shaft and/or wherein a plurality of paddles are arranged one behind the other in a circumferential direction of the shaft.

7. The hydraulic density separation device according to claim 1, wherein a radial paddle length is at least substantially equal to a web height of the winding of at least one adjacent screw conveyor section.

8. The hydraulic density separation device according to claim 1, wherein the shaft is arranged and mounted at an angle α with respect to a base, the angle α being one of the following: between 8° and 85°, between 10° and 70°, and between 12° and 20°; and/or wherein the shaft is mounted with its one shaft end in the region of the receiving chamber and with its other shaft end in the region of a discharge opening of the heavy material fraction.

9. The hydraulic density separation device according to claim 1, wherein an outflow opening of the flow generator opens into the receiving chamber and/or wherein the separation chamber is designed as a suction chamber for the flow generator.

10. The hydraulic density separation device according to claim 9, wherein the receiving chamber has a curved deflection area for the water flow at least substantially opposite the outflow opening and/or below the shaft; and/or wherein a center axis of the outflow opening runs below a central longitudinal axis of the shaft.

11. The hydraulic density separation device according to claim 1, wherein a weir is arranged between the receiving chamber and the separation chamber.

12. The hydraulic density separation device according to claim 1, wherein a further conveying device for discharging the light material fraction is assigned to the separation chamber.

13. The hydraulic density separation device according to claim 12, wherein the conveying direction of the further conveying device extends at least substantially opposite to the conveying direction of the conveying device; and/or wherein the receiving chamber and/or the separation chamber are arranged and designed in such a way that the flow path of the light material fraction into the separation chamber is deflected by 90°+/−20°.

14. The hydraulic density separation device according to claim 1, wherein a suction device is provided which is designed to suck off and/or suck in dirty water from the receiving chamber and/or from the separation chamber.

15. The hydraulic density separation device according to claim 1, wherein a separating plate is arranged at least in regions between the receiving chamber and a conveyor housing in which the shaft is arranged.

16. The hydraulic density separation device according to claim 7, wherein the distance between the outermost upper edge of the winding and/or of the paddle and one of the adjacent housing walls of a conveyor housing in which the shaft is arranged is one of the following: at least 30 mm, between 40 mm to 900 mm, and between 100 to 200 mm.

17. The hydraulic density separation device according to claim 9, wherein a suction pipe, which is arranged at least in regions in the separation chamber for sucking in water located in the separation chamber, is associated with the flow generator.

18. The hydraulic density separation device according to claim 11, wherein the flow path for the light material fraction extends from the upper region of the receiving chamber via the weir into the separation chamber.

19. The hydraulic density separation device according to claim 12, wherein the further conveying device has a riddle and/or vibrating screen and/or wherein the conveying plane of the further conveying device runs at least in regions below the upper edge of a weir arranged between the receiving chamber and the separation chamber.

20. A hydraulic density separation device for separating a heavy material fraction with components of higher density from a light material fraction with components of lower density from a feed material, comprising:

a conveying device for conveying away the heavy material fraction;

a receiving chamber which can be filled with water for receiving the feed material;

a flow generator for generating a water flow in the receiving chamber; and a water-fillable separation chamber for receiving the light material fraction;

wherein the conveying device has a shaft with at least one screw conveyor section for conveying the heavy material fraction out of the receiving chamber;

wherein the flow generator is designed and arranged in such a way that a flow path of the water flow leads from the receiving chamber into the separation chamber;

wherein the conveying device has, in addition to the screw conveyor section, at least one washing section having a plurality of separate paddles arranged on the shaft;

wherein an outflow opening of the flow generator opens into the receiving chamber and/or wherein the separation chamber is designed as a suction chamber for the flow generator; and wherein the receiving chamber has a curved deflection area for the water flow at least substantially opposite the outflow opening and/or below the shaft, and/or wherein a center axis of the outflow opening runs below a central longitudinal axis of the shaft.

* * * * *